US006445919B1

(12) United States Patent
Suonvieri (10) Patent No.: US 6,445,919 B1
(45) Date of Patent: Sep. 3, 2002

(54) ARRANGEMENT AND EQUIPMENT FOR HANDLING NOT-COMPATIBLE MESSAGES BETWEEN A MANAGEMENT SYSTEM AND NETWORK ELEMENTS CONTROLLED BY THE MANAGEMENT SYSTEM

(75) Inventor: Jukka Suonvieri, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/501,567

(22) Filed: Feb. 9, 2000

Related U.S. Application Data

(63) Continuation of application No. PCT/FI98/00628, filed on Aug. 14, 1998.

(30) Foreign Application Priority Data

Aug. 14, 1997 (FI) .................................................. 973327

(51) Int. Cl.[7] .............................. H04Q 7/20; H04J 3/22
(52) U.S. Cl. ........................ 455/424; 370/467; 370/392
(58) Field of Search ................................. 455/560, 423, 455/424, 524, 507, 11.1, 14, 15; 370/389, 392, 466, 467, 401

(56) References Cited

U.S. PATENT DOCUMENTS

| 5,420,916 A | * | 5/1995 | Sekiguchi | 370/467 |
|---|---|---|---|---|
| 5,513,343 A | | 4/1996 | Sakano et al. | 714/26 |
| 5,636,261 A | | 6/1997 | Fils | 379/10 |
| 5,655,001 A | * | 8/1997 | Cline et al. | 370/467 |
| 5,771,459 A | | 6/1998 | Demery et al. | 455/517 |
| 5,786,770 A | * | 7/1998 | Thompson | 340/825.06 |
| 5,809,028 A | | 9/1998 | Nethercott et al. | 370/467 |
| 5,832,503 A | * | 11/1998 | Malik et al. | 707/104 |
| 5,870,400 A | * | 2/1999 | Van Loon et al. | 370/466 |
| 5,894,478 A | * | 4/1999 | Barzegar et al. | 370/401 |
| 5,912,897 A | * | 6/1999 | Steinbach | 370/467 |
| 5,948,063 A | * | 9/1999 | Cooper et al. | 709/223 |
| 5,961,588 A | * | 10/1999 | Cooper et al. | 709/203 |
| 6,021,331 A | * | 2/2000 | Cooper et al. | 455/507 |
| 6,111,893 A | * | 8/2000 | Volftsun et al. | 370/466 |

FOREIGN PATENT DOCUMENTS

| WO | 96/26588 | 8/1996 | H04L/12/24 |
|---|---|---|---|
| WO | 96/38954 | 12/1996 | H04L/12/24 |
| WO | 96/38967 | * 12/1996 | H04L/29/06 |

OTHER PUBLICATIONS

International Search Report for PCT/FI98/00628.

* cited by examiner

*Primary Examiner*—William Trost
*Assistant Examiner*—Rafael Perez-Gutierrez
(74) *Attorney, Agent, or Firm*—Altera Law Group, LLC (57) ABSTRACT

The idea of this invention is to control different types of network elements with the same management system by connecting the network elements into the management system using a conversion element. The control messages such as alarms and acknowledgments transmitted by the network element via a modem and being dependent on the network element type are directed to the conversion element. The conversion element converts the message transmitted by the network element into a format understood by the management system and then transmits the converted message to the management system. Correspondingly, the management system transmits the configuration messages to the conversion element in its own format. The conversion element converts the message on the basis of the information about the identity of the receiving network element to the format used by the network element and transmits it forward. For the message format conversion, the conversion element uses a conversion file. The conversion file contains information about the message formats used by the different network elements and how the contents of the fields are to be converted from one format to another. When new types of network elements are added to the network, the conversion file is updated by adding the information required for converting the message format of the new network element type to the format understood by the management system.

6 Claims, 6 Drawing Sheets

| 6 | 6 | 4 | 2 | 1 | 1 | MAX 20 | 8 | 1 |
|---|---|---|---|---|---|---|---|---|
| SENDER ID | RECEIVER ID | PASSWORD | MESSAGE LENGTH | FUNCTION CODE | SPECIFIER | TEXT FIELD | TIME | VERIFICA-TION FIELD |

FIG. 1. (Prior Art)

| 2 | 4 | 2 | 2 | 1 | MAX 24 | 8 | 1 |
|---|---|---|---|---|---|---|---|
| MESSAGE ID | REPEATER ID | MESSAGE LENGTH | ALARM NUMBER | | TEXT FIELD | TIME | VERIFICA-TION FIELD |

FIG. 2A. (Prior Art)

| 2 | 4 | 6 | 1 | 1 | 6 | 8 | 1 |
|---|---|---|---|---|---|---|---|
| MESSAGE ID | REPEATER ID | PASSWORD | MESSAGE LENGTH | SETTING IDENTIFIER | NEW VALUE | TIME | VERIFICA-TION FIELD |

| AB0001 | HJ0001 | REPE | 03 | 1 | 3 | U=8 | 112502 | A |

FIG. 6A.

| 00 | A001 | 06 | 1C | U=38 V | 112502 | 7 |

FIG. 6B.

| FF | A001 | REPEAT | 2 | 4 | 40 | 112510 | 9 |

FIG. 7A.

| HJ0001 | AB0001 | REPE | 02 | 3 | 2 | 10 | 112510 | F |

FIG. 7B.

| AB0001 | HJ0001 | REPE | 02 | 2 | 2 | 10 | 112510 | 7 |

FIG. 8A.

| AA | A001 | REPEAT | 2 | 4 | 40 | 112510 | 3 |

FIG. 8B.

| 00 | B002 | 06 | 1C | U=20 V | 112524 | 3 |

FIG. 9.

| FF | B002 | TOISTI | 3 | 4 | 60 | 112528 | 4 |

FIG. 10.

| AA | B002 | TOISTI | 3 | 4 | 60 | 112528 | 7 |

FIG. 11.

ARRANGEMENT AND EQUIPMENT FOR HANDLING NOT-COMPATIBLE MESSAGES BETWEEN A MANAGEMENT SYSTEM AND NETWORK ELEMENTS CONTROLLED BY THE MANAGEMENT SYSTEM

This application is a continuation of international application Ser. No. PCT/FI98/00628, filed Aug. 14, 1998.

FIELD OF THE INVENTION

The invention is related to the centralized management of several telecommunications devices of different types, for example, of different manufacturers.

BACKGROUND OF THE INVENTION

In some network management systems, the network elements such as radio repeaters are connected to the network management system (NMS) using a modem connection. Through the modem connection, the network management system sends to radio repeaters configuration parameters such as the radio channels to be used, the transmission power, the phone number of the modem of the management system, etc. Correspondingly, the radio repeaters send the management system alarms indicating error situations and faults and acknowledgments of the configuration messages received from the NMS.

When communicating with the management system, the repeater always uses a certain message structure which corresponds to the management protocol of the repeater type. Examples of these kinds of message structures are presented in FIGS. 1, 2A, and 2B.

Figure 1:
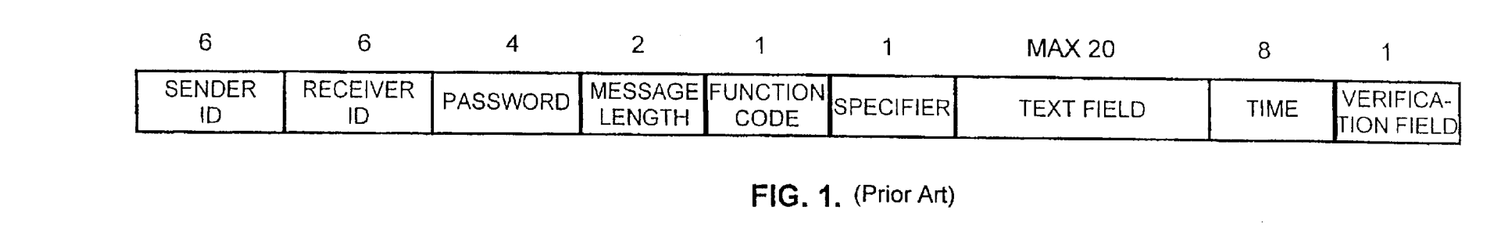
FIG. 1 shows an example of a message format used in the management of network elements.

FIG. 1 presents a message type in accordance with a possible management protocol used for controlling repeaters. The message begins with a sender identifier (6 characters) followed by a receiver identifier (6 characters). After these are fields for password (4 characters) and the length of a message text (2 characters). Then follow a function code (1 character), its specifier (1 character) and the text field of a maximum of 20 characters. At the end of the message there are a time field (8 characters) and a verification field consisting of 1 character.

Figure 2A:
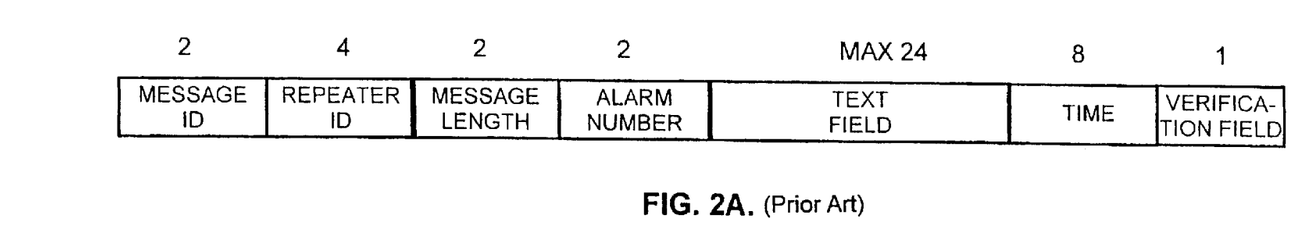
FIGS. 2A and 2B show another example of message formats used in the management of network elements.
Figure 2B:
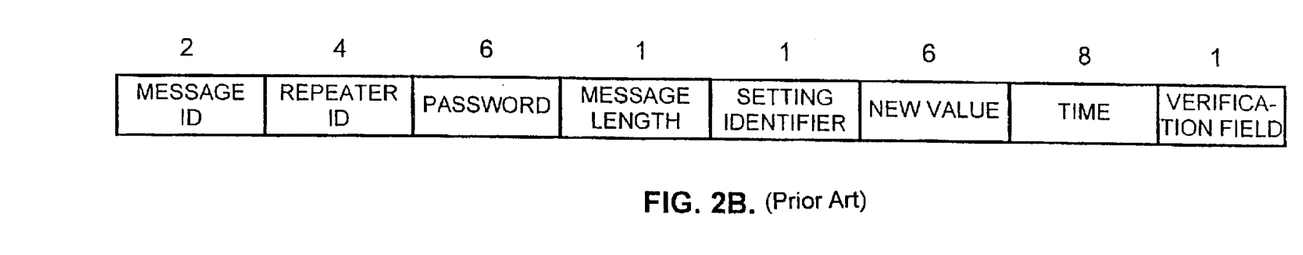

FIGS. 2A and 2B present message types in accordance with another possible management protocol used for controlling repeaters. Messages of the type shown in FIG. 2A are used for alarms raised by the repeaters and the message type in FIG. 2B for configuration messages transmitted by the management system and for the acknowledgments transmitted by the repeaters as answers to the configuration messages.

The alarm message in FIG. 2A begins with a message identifier, which is always 00 identifying alarm messages. After the identifier there is the identity information of the repeater (4 characters) and 2 characters stating the length of the text field. After these follow the alarm number (2 characters), a text field of a maximum of 24 characters, the time (8 characters) and the verification field (1 character).

The message in FIG. 2B also begins with a message identifier, which is FF for a configuration message or AA for an acknowledgment message. After the identifier there are the identity information for the repeater (4 characters), the password (6 characters) and 1 character stating the length of the new value to be assigned for the setting to be configured. After these follow the identifier of the setting to be configured (1 character), the new value for the setting (6 characters maximum), the time (8 characters) and the verification field (1 character).

In addition to the message structure, the codes used by different types of repeaters, like alarm numbers and other identifiers, also vary. For example, the alarm number of an alarm stating that the input voltage level in the repeater is abnormal could be "1" in the system presented in FIG. 1 and "1C" in the system presented in FIG. 2.

Repeaters and their management systems can typically use only one message type. Message types are almost always manufacturer-specific. Because of this, the repeaters and management systems of different manufacturers using different message types cannot communicate with each other.

In systems conforming to the technical level, a separate management system has been required for each repeater type. This kind of an arrangement is presented in FIG. 3 in which there are three repeaters: 1, 2 and 3, and the management systems used for them: NMS1 and NMS2 (NMS= Network Management System). Modems and a transmission network, which can be a telephone network, are used in the connections between the repeaters and the management systems. Repeaters 1 and 3 are of type 1 and they are controlled by using a compatible management system NMS1. Repeater 2 is of type 2 and it is controlled by using a compatible management system NMS2. Because of compatibility problems, repeaters 1 and 3 cannot be controlled by using management system 2 or repeater 2 by using management system 1.

Figure 3:
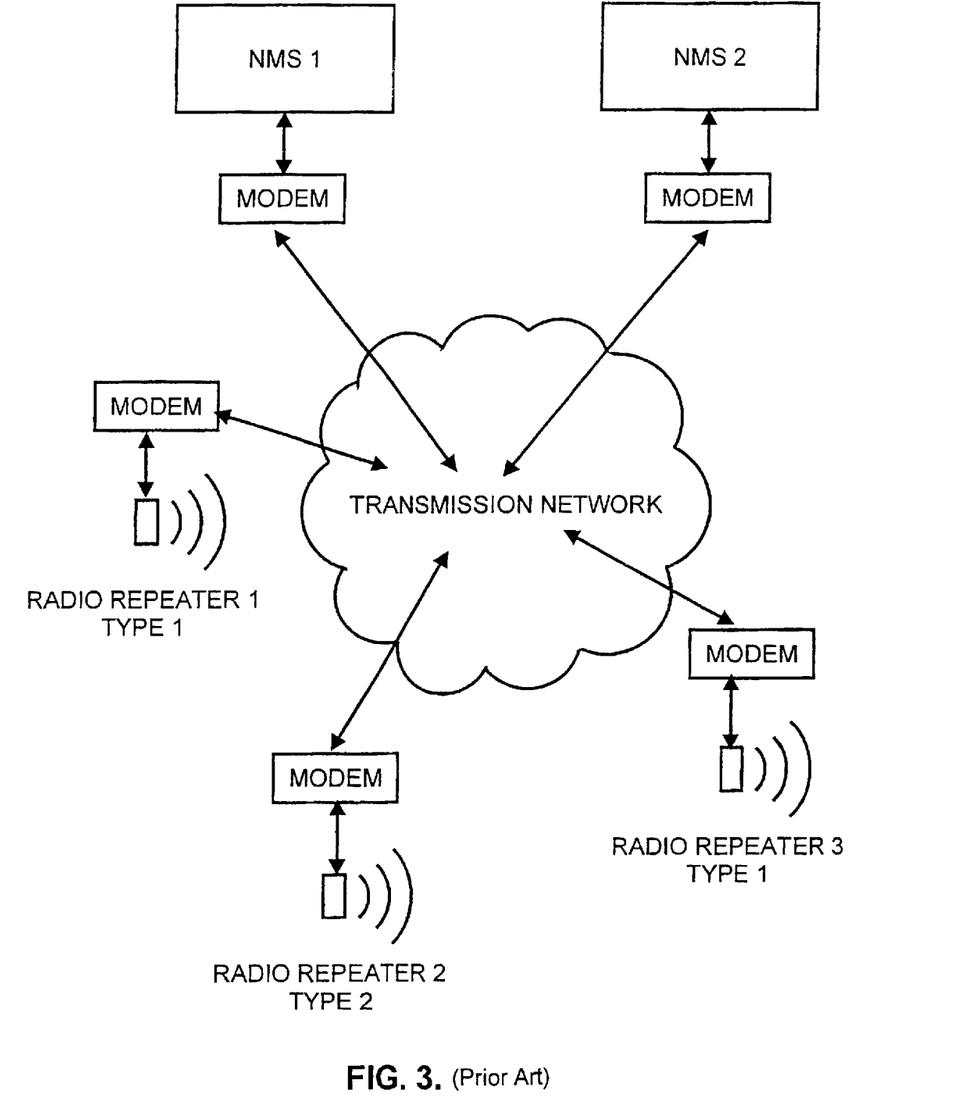
FIG. 3 shows an arrangement in accordance with the Prior Art for managing a network containing several types of radio repeaters.

The arrangement in FIG. 3 has many disadvantages. First, the network operator must purchase several management systems, which makes the investment expensive. Second, the personnel using the management system must be trained to use several different management systems. This requires much training and reserves personnel resources. The third disadvantage is the rigidity of the system in situations where the repeater configurations are dependent on each other. This kind of situation arises, for example, when the transmission power of repeater 1 is decreased and at the same time the transmission power of repeater 2 is increased by that same amount.

The objective of this invention is to remove these problems. This objective is achieved by using the arrangement and equipment described in the independent claims.

SUMMARY OF THE INVENTION

The idea of this invention is to control different types of network elements with the same management system by connecting the network elements into the management system using a conversion element. The control messages such as alarms and acknowledgments transmitted by the network element via a modem and being dependent on the network element type are directed to the conversion element. The conversion element converts the message transmitted by the network element into a format understood by the management system and then transmits the converted message to the management system. Correspondingly, the management system transmits the configuration messages to the conversion element in its own format. The conversion element converts the message, on the basis of information about the identity of the receiving network element, into the format used by the network element and transmits it forward.

For the message format conversion, the conversion element uses a conversion file. The conversion file contains information about the message formats used by the different network elements and how the contents of the fields are to be converted from one format to another. When new types of network elements are added to the network, the conversion file is updated by adding the information required for converting the message format of the new network element type into the message format understood by the management system.

BRIEF DESCRIPTION OF THE FIGURES

The invention is described more closely with reference to the accompanying drawings, in which.

DETAILED DESCRIPTION OF THE INVENTION

Figure 4:
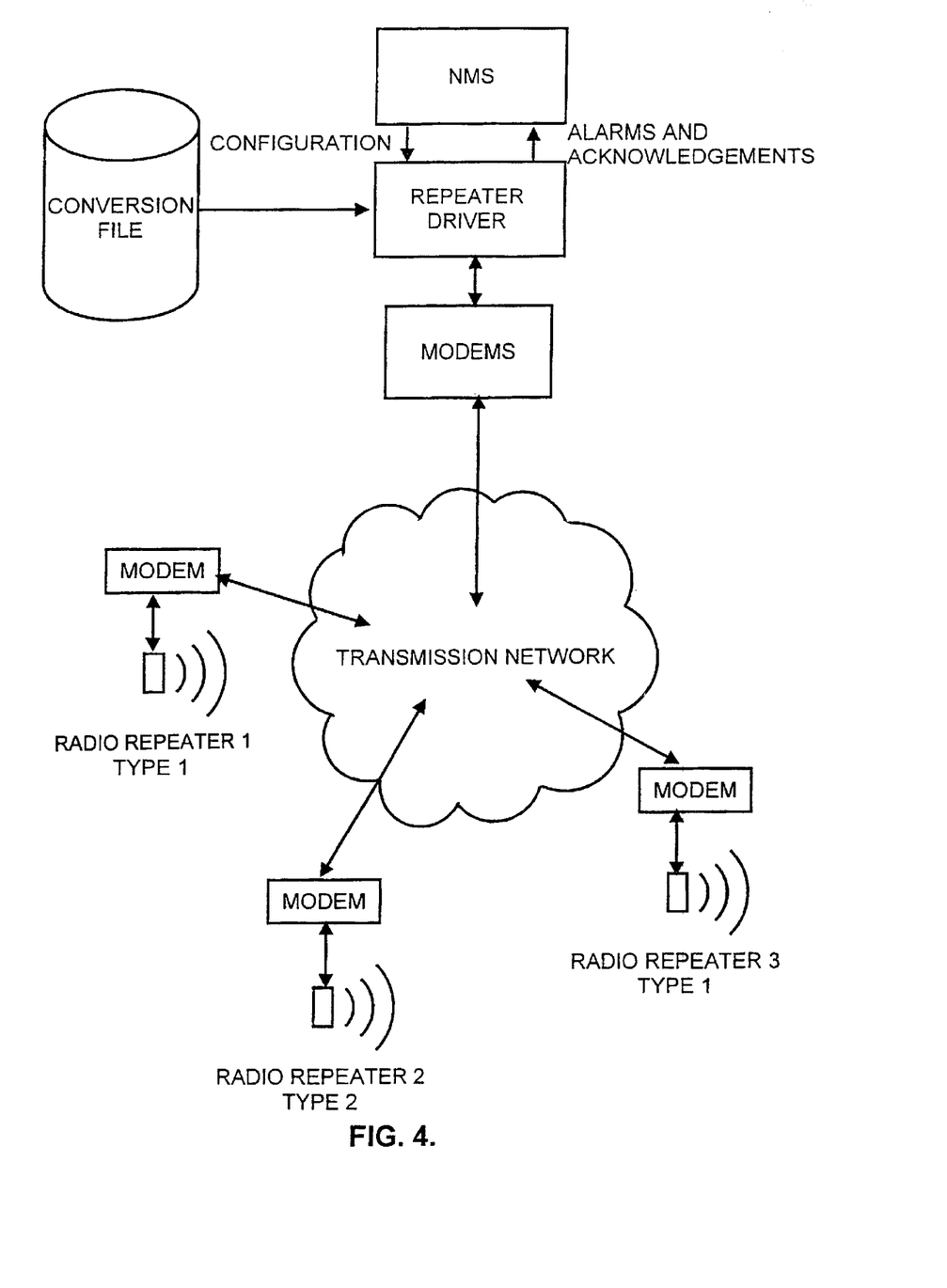
FIG. 4 shows an arrangement in accordance with the invention for managing a network containing several types of radio repeaters.

An arrangement for the centralized management of several different types of radio repeaters in accordance with the invention is shown in FIG. 4. The management system NMS is connected to the repeaters via a repeater driver used as a conversion element. The repeater driver identifies the message types of the messages coming from the repeaters and converts the messages, such as alarms, coming from different types of repeaters to a uniform format and transmits them forward to the management system. Correspondingly, the driver converts uniform format messages such as configuration messages sent by the management system to the repeaters to a format recognized by the receiving repeater.

The repeater driver identifies the type of message coming from a repeater, for example, on the basis of the repeater identifier, message length or some other feature of the messages used by the repeater type. The repeater identifier can be searched for by comparing certain parts of the message, which correspond to the identity blocks of different message types, to the repeater identity information known by the driver and concerning the repeaters managed by the management system. The identity of the network element which has transmitted the message can be determined also, for example, by directing the messages sent by network elements of different types to different modems on the management system side.

Typically, an alarm message includes the repeater identifier, the alarm number, the code of the unit that raised the alarm, and the alarm text. Their places and formats in the message vary. After the repeater type has been identified, the repeater driver converts the alarm message into a uniform format on the basis of the information about the message type used by the repeater. This information has been saved in the conversion file. The conversion file contains information about the place of the alarm number in the alarm message, the method used for coding the number, other information included in the message and method for coding the information. After the message sent by the repeater has been converted into the uniform format, it is forwarded to the repeater management system. In this way the management system can receive alarms from several different types of repeaters.

When the management system transmits to a repeater messages concerning the configuration of the repeater, such as commands for changing power or frequency, the management system always transmits the message first in its own message format to the repeater driver. When the repeater driver receives the message, it searches for the receiver identifier in the message. On the basis of the identifier the driver retrieves from the conversion file the information required for converting the message type used by the management system to the message type used by the receiving repeater. After this the message is converted to the format known to the receiving repeater and transmitted to the receiver.

When new types of repeaters are added to the network, the conversion file is updated by adding to it the information required for converting messages of the message type used by the new repeater type into the message types used by the management system.

Figure 5:
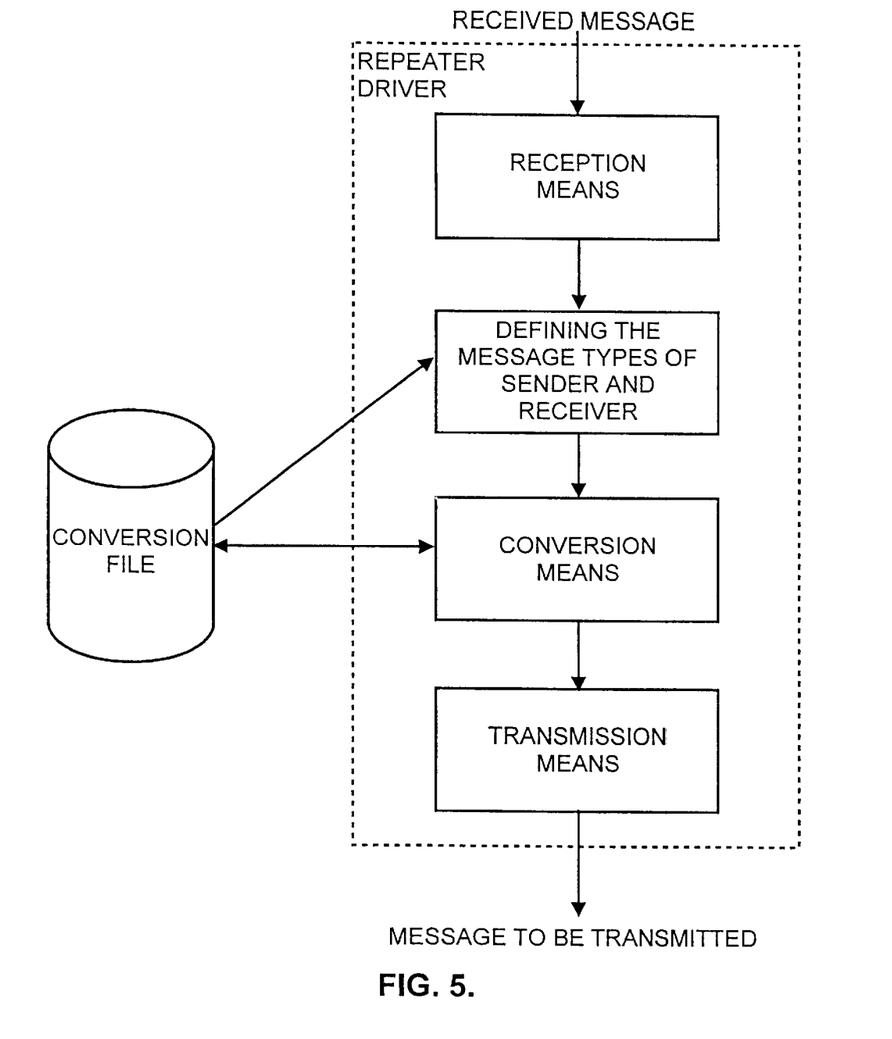
FIG. 5 shows functional blocks of a repeater driver.

The functional blocks of the repeater driver are shown in FIG. 5. The messages are received and buffered by reception means. Received messages are entered into a block, which identifies the message types used by the sender and receiver. One of these, the message type used by the management system, is already known by the driver even before examining the received message. The block gets the information required for identifying the message type from the conversion file, if necessary. The received message, its type and the type of the converted message are entered into the conversion means, which convert the message to the requested format. Information from the conversion file is used in making the conversion. The converted message is transmitted forward by transmission means, which take care of transmitting the message to the receiver. The repeater driver can also change some of the information in the conversion file, such as the passwords used in different message types, in accordance with the configuration messages it has received from the management system.

Let us now consider an example in which repeaters 1 and 2, which are of different type, both send an alarm to the management system about too low input power to the management system. After the management system has received the alarms, it commands the repeaters to decrease their transmission power so that they can operate reliably even though the input power has decreased.

The management system understands and can form messages conforming to FIGS. 2A and 2B. Messages from repeater 1 are in the format shown in FIG. 1, so the management system does not understand them directly. Messages from repeater 2 are in the format shown in FIGS. 2A and 2B.

Figure 6A:
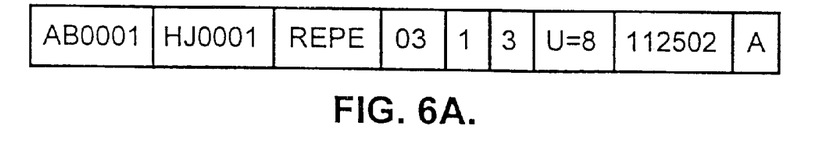
FIGS. 6A and 6B show an alarm message in two different formats.

First, repeater 1 raises an alarm by transmitting an alarm message such as the message shown in FIG. 6A. In accordance with the message type shown in FIG. 1, the identifier of the message sender is AB0001 and the message is addressed to a management system, whose identifier is HJ0001. The password is the character string REPE, the length of the text field is 3 characters, the function code 1 means that the message is an alarm and the specifier 3 means that the alarm concerns the input voltage. The text field contains the information U=8, which means that the input voltage is 80% of its normal value of 48 V. The alarm was raised at 11:25:02 and the verification code gets a value A.

A message conforming to FIG. 6A is transmitted via a modem connection to the management system modem from which the repeater drivers receive it. In this simplified example the repeater drivers can identify only two message types, one conforming to that in FIG. 1 and other to those in FIGS. 2A and 2B. The driver recognizes the sender identifier AB0001 at the beginning of the message and, on the basis of that, determines that the message is of message type 1.

Figure 6B:
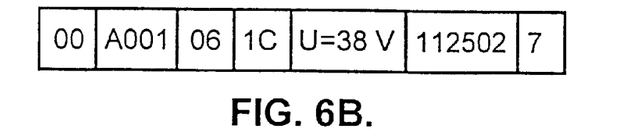

After the repeater driver has interpreted the message type, it can determine, on the basis of the information it has retrieved from the conversion file, that the message is an alarm about low input voltage. The voltage is stated to be 80% of the normal value. According to the conversion file, the normal value is 48 V, so the voltage is 0.8*48 V=38 V. The repeater driver converts the identifier AB0001 of the received message type 1 to the identifier A001 of message type 2 by using the conversion file. Based on this information, the driver forms an alarm message of type 2 as shown in FIG. 6B. This message has the type 00, which means that it is an alarm message. The driver transmits this message to the management system.

Figure 7A:
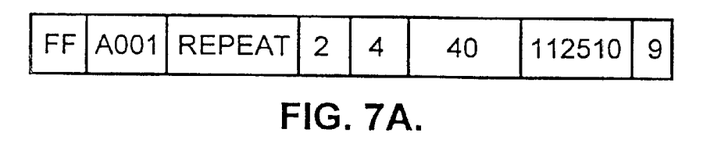
FIGS. 7A and 7B show a configuration message in two different formats.

The management system receives the message and decides to decrease the transmission power of the repeater so that it can operate even with the lower input voltage. The system transmits to the repeater a message conforming to FIG. 7A. The message type is FF, which means that it is a configuration message. The system uses the password REPEAT, which conforms to the message type 2 of repeater 1. The length of the setting field is 2 characters, the setting identifier is 4=transmission power, the new setting is 40% of the maximum value (25 W for this repeater type) and the time is 11:25:10.

The formed configuration message is transferred to the repeater driver for transmission. The driver knows that the messages coming from the management system are of the message type 2. When the driver has checked the message, it knows, based on the identity A001 (conforming to the message type 2) of the receiving repeater 1, that the repeater only understands messages of the message type 1. The driver converts the message it has received from the management system (shown in FIG. 7A) to a message of type 2 (shown in FIG. 7B). It marks the management system (HJ0001) as the sender of the message and the repeater (AB0001) as the receiver. By using the conversion file, the password REPEAT conforming to the message type 2 is converted to the password REPE conforming to the message type 1. The length of the new setting in the text field is 2 characters, the message is a configuration message (3) and its specifier is transmission power (2). In this message type, the new setting for the transmission power is stated in Watts. In this case it is 10. The repeater driver transmits the converted message to repeater 1 by using the modem connection it has set up.

Figure 7B:
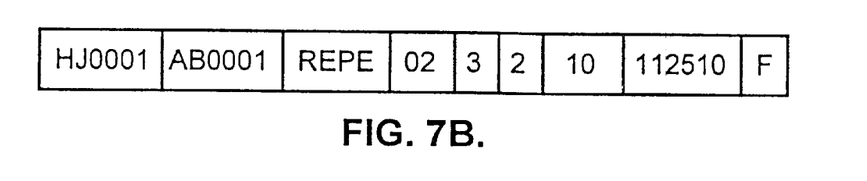
Figure 8A:
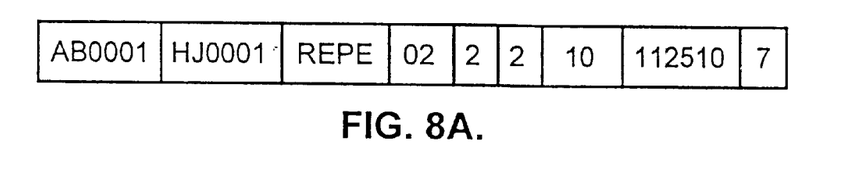
FIGS. 8A and 8B show an acknowledgment message in two different formats.

Repeater 1 receives the configuration message shown in FIG. 7B, adjusts its transmission power and forms an acknowledgment message as shown in FIG. 8A. The structure of the message is similar to the structure of the message shown in FIG. 7B. Compared to the message in FIG. 7B, the only differences are the sender and receiver identifiers, which have changed place, and the function code, which has changed from the value (configuration) to the value (acknowledgment). Additionally, the verification code gets a new value of. The message formed is transmitted to the management system via the modem connection.

Figure 8B:
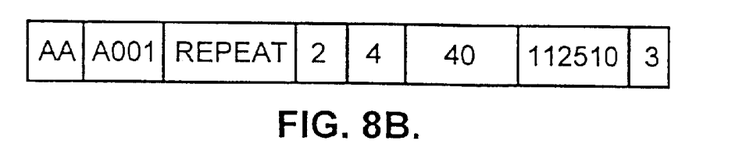

The repeater driver receives the acknowledgment message transmitted by the repeater. Based on the features of the message, the driver knows that it is of type 1 and that the sender is repeater 1. The repeater converts the message to a format conforming to message type 2. The result is the message shown in FIG. 8B. The message is almost the same as the configuration message in FIG. 7A. The only differences are the message identifier, which has changed from FF (=configuration) to AA (=acknowledgment), and the verification code, which has got a new value 3.

The management system receives the message and the connection can be terminated.

A moment later repeater 2 notices that its input voltage has decreased and is under the alarm limit. It informs the management system of this by transmitting to it an alarm message conforming to FIG. 9. The message is of type 2 in accordance with the repeater type. The message is an alarm (00), the sender is repeater 2 (B002), the length of the alarm text is 6 characters, the alarm number is 1C (low input power) and the value of the input voltage is 20 V. The time of the alarm is 11:25:24 and the verification code of the message is 3. The repeater sends the formed alarm message to the modem of the management system.

From the management system modem the message is forwarded to the repeater driver, which knows, on the basis of the sender identity, that the message conforms to the message type 2 understood by the management system. Therefore, it transmits the message to the management system as such.

Figure 9:
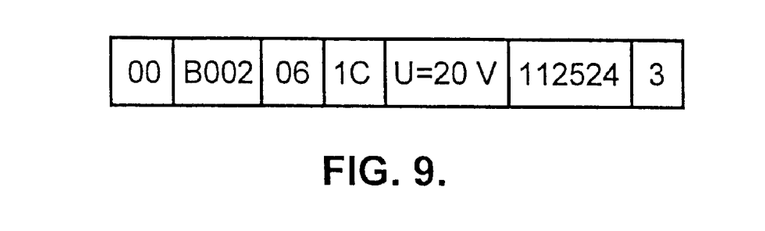
FIG. 9 shows an alarm message.
Figure 10:
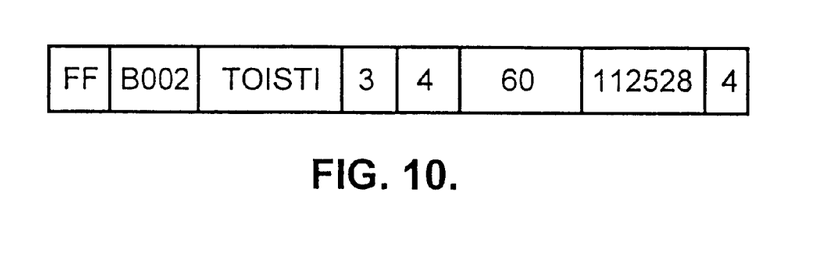
FIG. 10 shows a configuration message.

The management system receives the message shown in FIG. 9 and decides to decrease the transmission power of repeater 2 so that it can operate even with the lower input voltage. The system forms the message shown in FIG. 10 to be transmitted to repeater 2. The message type is FF, which means that it is a configuration message. The system uses the password TOISTI, which conforms to the message type 2 of repeater 2. The length of the setting field is 3 characters, the setting identifier is 4=transmission power, the new setting is 60% of the maximum value (15 W for this repeater type) and time is 11:25:28.

The formed configuration message (shown in FIG. 10) is transferred to the repeater driver for transmission. The driver knows that the messages coming from the management system conform to the message type 2. When the driver has checked the message, it knows, based on the identity B002 (conforming to the message type 2) of the receiving repeater 2, that the repeater understands messages of the message type 2 and so it transmits the message to the repeater as such via the modem.

Figure 11:
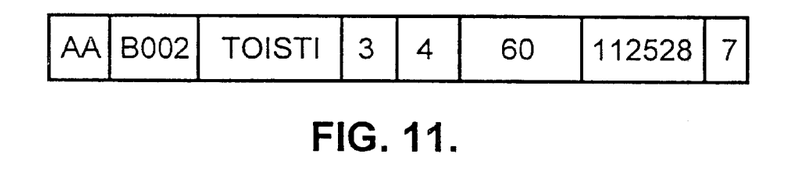
FIG. 11 shows an acknowledgment message.

Repeater 2 receives the configuration message, adjusts its transmission power and forms an acknowledgment message shown in FIG. 11. The message is almost the same as the configuration message shown in FIG. 10. The only differences are the message identifier, which has changed from FF (=configuration) to AA (=acknowledgment), and the verification code, which has got a new value 7. The management system receives the message and the connection can be terminated.

The scope of the invention is not limited to the management system of radio repeaters as presented in the examples above, but can also be used for managing other kinds of systems comprising several types of network elements. Likewise, the use of a modem connection is not essential in the invention as the data transfer can also be arranged in some other way, for example, by using a packet switched communications network. Even though it is advantageous to place the conversion unit near the management system, this is not essential for the invention as the conversion unit may be placed in any part of the network. The only requirement is that the conversion unit must be able to communicate with the network elements and their management system.

What is claimed is:

1. Equipment for handling messages in a system including a network management system and network elements controlled by the network management system, the equipment comprising:

messages, concerning the management of a network, being used by the network management system, the messages being incompatible with the network management system's network elements, reception means for receiving messages, identification means responsive to the reception means for identifying a network element identity, selection means for selecting conversion data needed for a message, wherein the selection is made on the basis of the network element identity, conversion means responsive to the identification means for converting the message to a message type used by a receiver, wherein the conversion means includes a conversion file, which links the network element identity with a conversion, and transmission means responsive to the conversion means for transmitting the converted message to the receiver.

2. An arrangement for handling messages, concerning the management of network elements, in a system including a management system and network elements controlled by the management system, the arrangement comprising:

network elements, wherein the network elements use message formats incompatible with a message format used by a management system, a message, transferred between the management system and a network element controlled by the management system, is routed to a conversion element storing conversion data for conversions to be performed between the message formats used by the network elements and management system, wherein conversion element information needed for converting the message is selected from said conversion data on the basis of the network element indicated in the message, the information selected is used to convert the message into a format compatible with a message format of a receiver, and the converted message is transmitted to the receiver.

3. The arrangement according to claim 2, wherein a type of the message is identified by comparing predetermined parts of the message, corresponding to message type blocks of the messages used in the system, to a message type information contained in the conversion data.

4. The arrangement according to claim 2, wherein the message conversion uses the conversion data, the conversion data further comprising the information required for converting a message type.

5. The arrangement according to claim 2, wherein the network element is a radio repeater.

6. A method for handling messages in a system including a network management system and network elements controlled by the network management system, the method comprising:

maintaining conversion data in a conversion element, routing messages which are in different formats to the conversion element, and in the conversion element, selecting information from conversion data on the basis of the network element indicated in the message, using the selected information for converting the message into a message format compatible with the message format used by a receiver of the message, and transmitting the converted message to the receiver.

* * * * *